INVENTORS
EDWARD GEORGE DAVID ANDREWS,
HARRY OLDFIELD,
GORDON TERRY HEALEY.

3,516,251
ROCKET ENGINE
Edward George David Andrews, Cawston, near Rugby, Harry Oldfield, Coventry, and Gordon Terry Healey, Staverton, near Daventry, England, assignors to Rolls-Royce Limited, Derby, England, a British company
Filed June 3, 1968, Ser. No. 734,134
Claims priority, application Great Britain, June 3, 1967, 25,754/67
Int. Cl. F02k 9/02
U.S. Cl. 60—39.48                                    4 Claims

ABSTRACT OF THE DISCLOSURE

Rocket engine in which a propellant is supplied from a pressurised container to a combustion chamber. The container is pressurised by divering a part of the propellant through a pump to a gas generator in which the propellant is used to produce a gas which is then supplied to the propellant container. The pump may be driven by a turbine supplied with gas from the gas generator. The turbine exhaust may be used to cool a wall of the combustion chamber. The gas generator may also be used to effect blast atomisation of the propellant admitted to the combustion chamber. The engine may have a monopropellant or a multipropellant system.

---

The invention relates to a rocket engine and is particularly concerned with a system for supplying pressurised propellant to a combustion chamber of a rocket engine.

According to the invention, a rocket engine comprises a combustion chamber, means defining at least one propellant supply path leading to the combustion chamber, a gas generator connected to the propellant supply path or paths, whereby part of the propellant flowing therethrough will be diverted via a pump to the gas generator, means defining a gas supply path leading from the gas generator, the means defining the propellant and the gas supply paths being arranged to be connected to at least one propellant container, whereby gas produced in the gas generator is employed to pressurise propellant in the container or containers and to discharge propellant therefrom through the propellant supply path or paths.

The or each pump may be driven by any prime mover. Conveniently, the or each pump is drivingly-connected to a turbine arranged to be driven by part of the gas produced by the gas generator. The turbine outlet may be connected to the combustion chamber, whereby the gas exhausted by the turbine is used to cool a wall of the combustion chamber.

Another part of the gas produced in the gas generator may be introduced into the combustion chamber together with the propellant to be introduced thereto, thereby to effect blast atomisation of the propellant.

Connecting means may be provided whereby the or each propellant container may be connected to or detached from the said propellant and gas supply paths. The provision of such connecting means enables an empty propellant container to be removed and replaced by a fresh one. The or each propellant container may be sealed prior to use and include a seal capable of being opened by the action of applying expulsion gas pressure to said container.

By way of example, a rocket engine having a pressurised propellant supply system in accordance with the invention is now described with reference to the accompanying drawings, in which.

Figure 1:
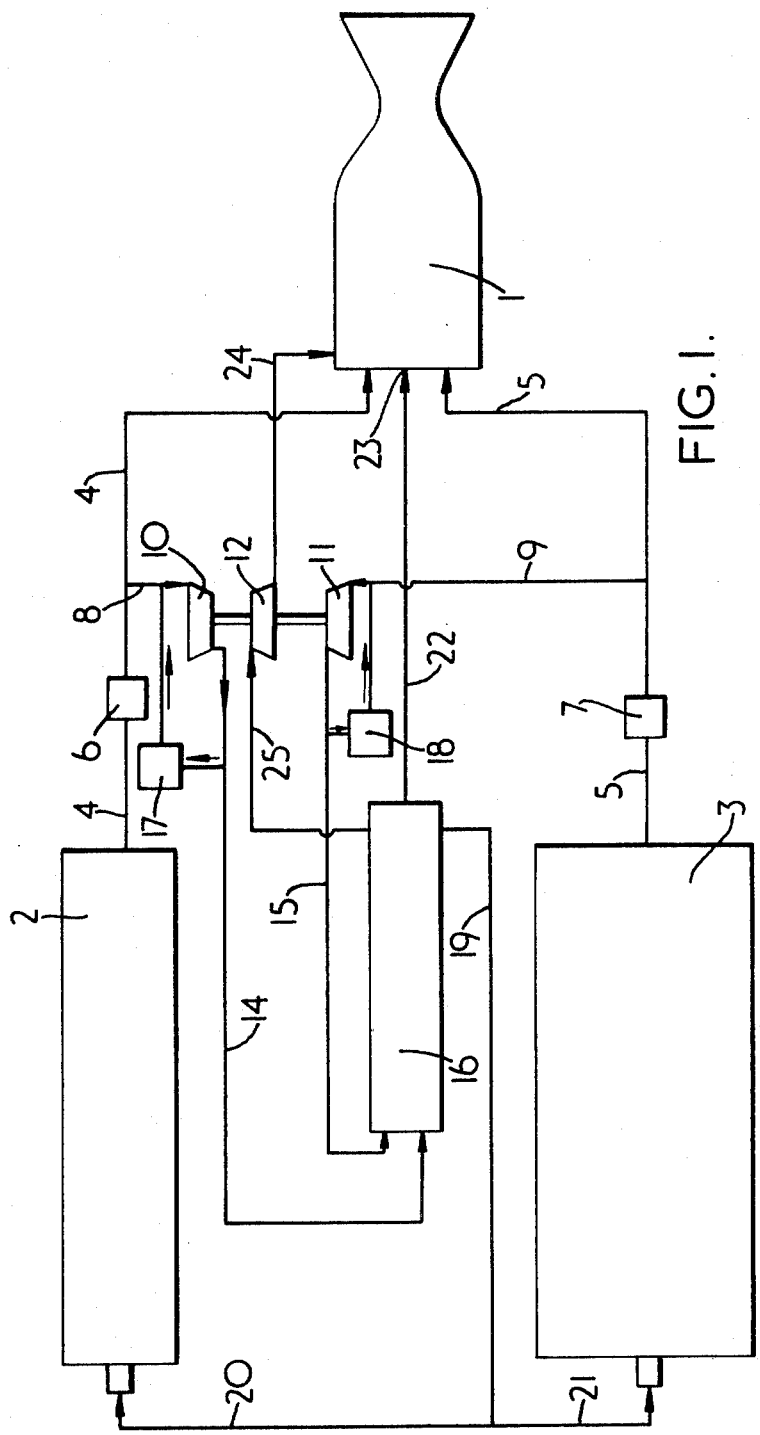
FIG. 1 is a diagram showing the layout of the engine and the propellant supply system.

Referring to FIG. 1, the engine includes a combustion chamber 1, arranged to be supplied adjacent its upstream end with two pressurised propellants, e.g., hydrazine and chlorine trifluoride. The two propellants are contained in containers 2 and 3, respectively. Each container is connected by a supply pipe 4, 5, respectively, via a throttle valve 6, 7, to the combustion chamber 1. Either downstream (as shown) or upstream of each throttle valve, a branch pipe 8, 9 leads to a rotary pump 10, 11. The two pumps 10, 11 are drivingly connected to a common turbine 12. Each pump 10, 11 is connected by a pipe 14, 15 to a gas generator 16. The quantity of propellant delivered by each pump 10, 11 to the gas generator 16 may be controlled by a spill valve 17, 18. The two propellants react in the gas generator to produce a gas which is supplied by way of a pipe 19 to pipes 20 and 21 to the ends of the containers 2 and 3 remote from the supply pipes 4, 5 and by way of a pipe 25 to the turbine 12. By this system a small quantity of each propellant is diverted from the main supply pipes 4, 5 and is used to produce in the gas generator 16 a gas for pressurising the containers 2 and 3.

An additional optional feature of the system is the conveying of gas from the gas generator 16, through a pipe 22 to an inlet 23 at or adjacent the propellant inlets to the combustion chamber. In this way blast atomisation of the propellants can be effected. Another optional additional feature is the conveying of the exhaust from the turbine 12 through a pipe 24 to cool the peripheral wall of the combustion chamber or its nozzle.

The pipes 4, 5 and 20, 21 are conveniently provided with connectors whereby the containers 2 and 3 can be readily removed or inserted in the system. This enables an empty container to be readily replaced by a fresh one. The containers may be sealed and may have seals or wall portions which will be opened by the pressure of the expulsion gas after the containers have been connected in the system. This is a particularly important feature where a propellant is toxic or corrosive.

If necessary, the turbine 12 may be started by a solid propellant charge or by feeding a high pressure gas supply (e.g., from a pressurised container) to the turbine 12.

Instead of driving the pumps 10 and 11 by the turbine 12, they may be driven by an electric motor.

Although the drawing illustrates a bipropellant system, the invention also includes a monopropellant or other multipropellant system.

Where the rocket engine has a monopropellant system, the propellant, e.g., hydrazine, would be supplied via only one pump (e.g., 10) to the gas generator 16, where the propellant would be decomposed.

Other advantages of the system described hereinbefore are as follows:

(a) The gas generator 16 uses one or more of the propellants used by the combustion chamber 1. Therefore, it is not necessary to provide a different propellant such as a solid propellant either for the turbine 12 (except, possibly for starting) or for the expulsion of the propellants from their containers.

(b) As the propellants supplied to the gas generator 16 for providing gas for pressurising the containers 2, 3 are the same as the propellants supplied to the combustion chamber, the latter may be so controlled that the ratio in which the propellants are used, including the feed to the gas generator, is substantially the same at all thrust levels.

(c) The combustion chamber can be stopped by control valves provided to shut down the gas generator 16 and the combustion chamber 1, while maintaining gas pressure in the containers 2 and 3, which can subsequently be used for restarting.

(d) The elimination of a solid propellant charge for pressurising the containers 2 and 3 extends the range of environmental conditions over which the system can be operated.

(e) The pumps 10 and 11 pass only a small proportion of the total propellant flow through the branch pipes 8 and 9 and therefore only a small power requirement is necessary to drive them. Instead of using the turbine 12, it is possible, therefore, to use an electric motor, as mentioned hereinbefore, and this may be supplied by existing electrical power sources in a vehicle in which the rocket engine is fitted.

(f) The gas produced in the gas generator 16 is cleaner than that from a solid pressurising charge and so the rocket engine could be reused without excessive cleansing cost.

(g) The gas generator may be suitably designed to permit a gas of differing composition and temperature to be tapped from different positions therein. Thus the gas to be supplied to the pipe 19, the turbine 12 or the blast atomisation inlet 23 may be selected in accordance with the duty required of it.

Figure 2:
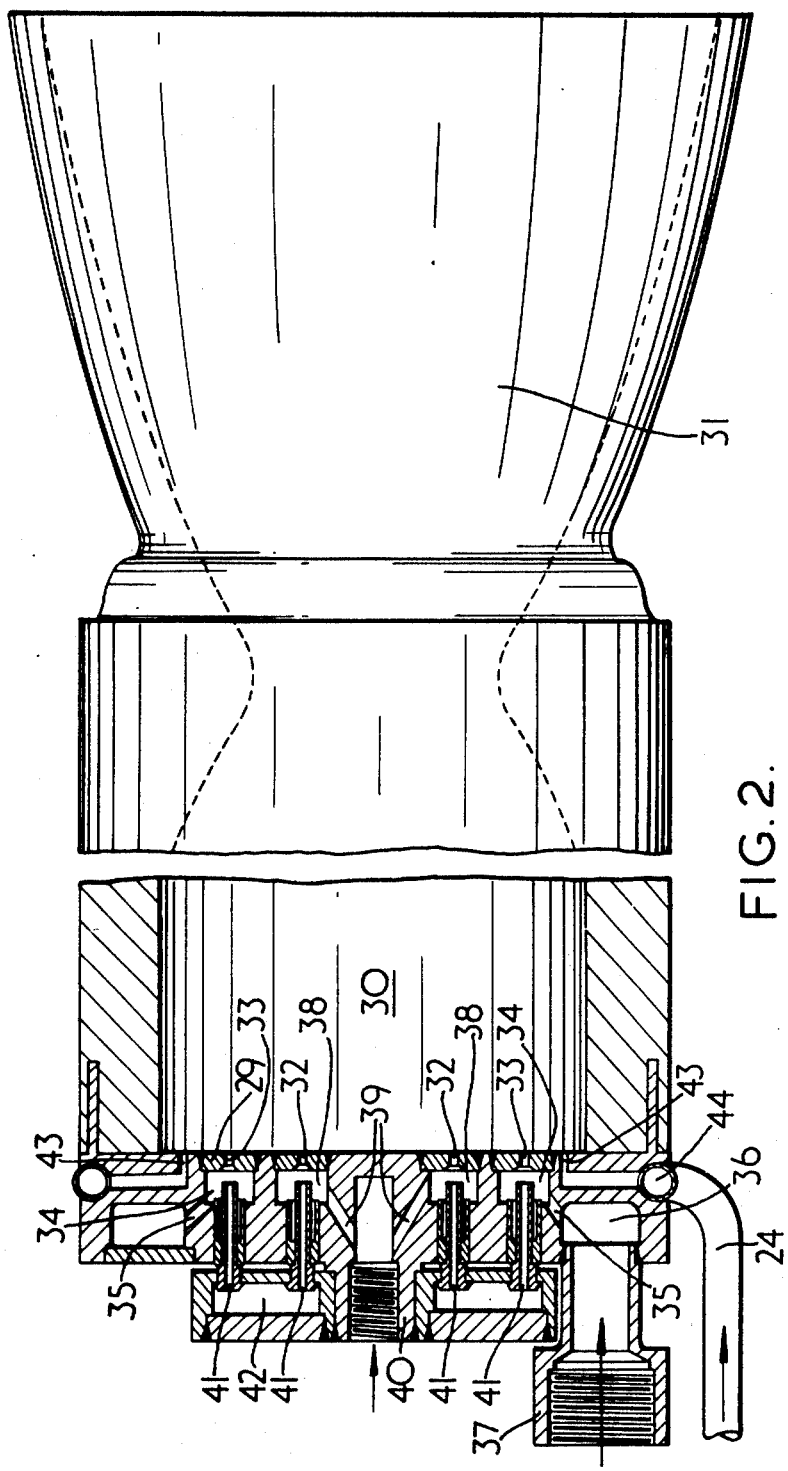
FIG. 2 is a side elevation and part axial section of a combustion chamber of the engine.

Referring now to FIG. 2, it will be seen that the combustion chamber 1 defines a combustion region 30 leading to a convergent-divergent propulsion nozzle 31. The upstream end wall 29 of the combustion chamber contains ports 32 and 33 for admitting the propellants to the combustion region, where they will interact. The ports 33 each communicate with a chamber 34 supplied through a passage 35 from an annular chamber 36 communicating with an inlet pipe connector 37 to which the pipe 5, supplying one of the propellants, is connected. The ports 32 each communicate with a chamber 38 supplied through a passage 39 communicating with a pipe connector 40 to which the pipe 4, supplying the other of the propellants, is connected. Each of the passages 35 and 39 leads into the respective chamber 34 or 38 obliquely to the respective port 32 or 33 and tangentially thereto. Each chamber 34 and 38 is also supplied through a passage 41 extending coaxially of the respective port 32 or 33. The passages 41 communicate at their upstream ends with a common annular chamber 42 supplied with gas from the gas generator 16 through the pipe 22. The connection of the pipe 22 and the chamber 42 does not appear in FIG. 2. In operation, a stream of gas will flow from each passage 41 and flow directly to the respective port 32 or 33 and will mix with the appropriate propellant which will flow with a swirling motion through the passage 35 or 39 and so effect blast atomisation of the propellant as it is admitted into the combustion region 30. The upstream end wall 29 also contains a ring of ports 43 adjacent the peripheral wall of the combustion chamber and communicating with an annular manifold 44 supplied through the pipe 24 (also shown in FIG. 1) with expanded gas from the turbine 12. The purpose of the ports 43 is to provide an envelope of gas to keep the peripheral wall of the combustion chamber cool. Instead of the ports 43 being in the upstream end wall 29, they could be positioned further downstream of the combustion chamber, for example, adjacent the throat or at the upstream end of the divergent part of the nozzle.

Figure 3:
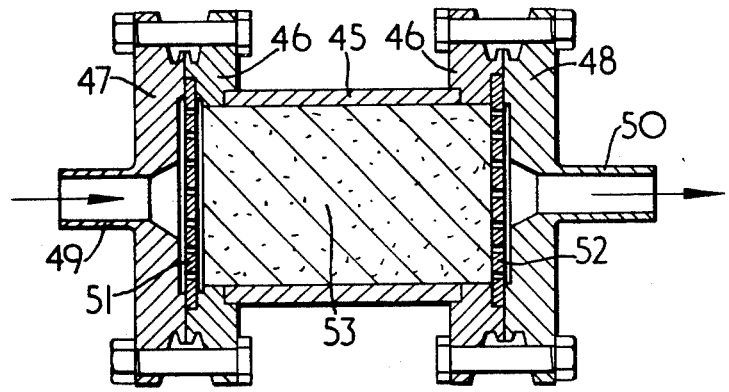
FIG. 3 is an axial section through a gas generator for an alternative propellant supply system.

FIG. 3 shows a gas generator similar to the gas generator 16 shown in FIG. 1 but intended instead for a monopropellant system. The gas generator shown in FIG. 3 comprises a cylindrical casing 45 provided at each end with an annular flange 46. Each flange 46 has bolted to it an annular flange 47 or 48 carrying respectively an inlet pipe 49 and an outlet pipe 50. A perforated plate 51 or 52 is clamped between each pair of flanges 46, 47 and 48. The interior of the casing 45 is packed with an appropriate catalyst 53. The propellant is introduced through the pipe 49. It passes through the plate 51 and is decomposed by the catalyst 53 into a gas which is discharged through the plate 52 and the pipe 50. The latter is a common pipe leading to branches providing the separate streams of gas passing through the pipes 19, 25 and 22 shown in FIG. 1. Where a bipropellant system is employed, as in the system shown in FIG. 1, the flange 47 would carry two inlet pipes, one for each propellant.

Figure 4:
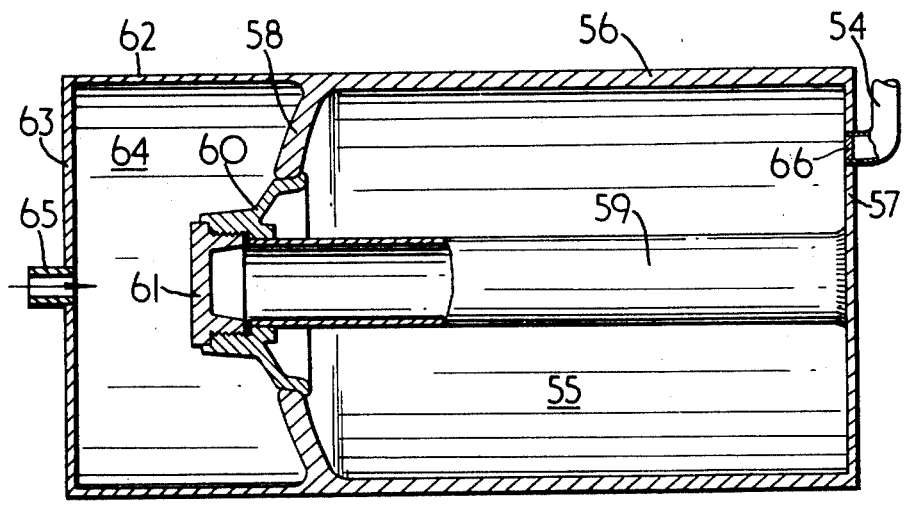
FIG. 4 is a section through a propellant tank for use in the propellant supply system shown in FIG. 1.

FIG. 4 shows a propellant container such as the container 2 or 3 shown in FIG. 1. The container comprises a chamber 55 bounded by a peripheral wall 56, a downstream end wall 57 having an outlet pipe 54 communicating with the delivery pipe 4 or 5, shown in FIG. 1, and an upstream annular end wall 58. The end wall 57 carries a central tube 59 extending through the chamber 55 and carrying an annular seal 60 held in position by a cap 61. The seal 60 is secured to the end wall 58. The peripheral wall 56 has an annular extension 62 which together with an end wall 63 and the end wall 58 and the seal 60 defines a chamber 64 to which gas from the gas generator 16 can be admitted through an inlet pipe 65 to be connected to the pipe 20 or 21, shown in FIG. 1. No propellant will escape from the chamber 55 until the pipe 20 or 21 has been connected to the inlet pipe 65 and the gas pressure, initially produced by a starting charge (not shown), has increased sufficiently within the chamber 64 as to cause the seal 60 to rupture. The gas will then flow from the chamber 64 into the chamber 55 and so displace propellant through the pipe 54 after rupturing a seal 66 therein.

What we claim as our invention and desire to secure by Letters Patent of the United States is:

1. A rocket engine comprising a combustion chamber, propellant inlet means thereto, first duct means defining a propellant supply path leading to said propellant inlet means, a propellant container connected to said first duct means, second duct means defining a branch path leading from said first duct means, a pump connected in said second duct means, a gas generator supplied by said pump with propellant from said container via said second duct means, third duct means defining a gas supply path leading from said gas generator to provide gas to pressurise propellant in said container, a turbine drivingly connected to said pump, and fourth duct means interconnecting said gas generator and said turbine for supplying gas generator to drive said turbine, wherein the improvement comprises a blast atomisation inlet adjacent said propellant inlet means and fifth duct means connecting said gas generator to said blast atomisation inlet.

2. A rocket engine comprising a combustion chamber having a bi-propellant supply, two propellant containers, one for each propellant, and a common gas generator for providing gas to pressurise propellant in each said container wherein the improvement comprises, for each propellant separately, first duct means defining a propellant supply path leading to said propellant inlet means, second duct means defining a branch path leading from said first duct means and a pump connected in said second duct means to supply propellant to said gas generator, and third duct means defining a gas supply path leading from said gas generator to both said propellant containers.

3. A rocket engine as claimed in claim 2 including a turbnie drivingly connected to both said pumps, and fourth duct means interconnecting said gas generator and said turbine for supplying gas from said gas generator to drive said turbine.

4. A rocket engine as claimed in claim 3 including a blast atomisation inlet adjacent said propellant inlet means and fifth duct means connecting said gas generator to said blast atomisation inlet.

References Cited

UNITED STATES PATENTS

| | | | |
|---|---|---|---|
| 2,852,916 | 9/1958 | Hearn | 60—39.48 |
| 2,949,007 | 8/1960 | Aldrich | 60—39.48 |
| 3,127,743 | 4/1964 | Kern | 60—39.48 |
| 3,170,295 | 2/1965 | Appel | 60—39.48 |

FOREIGN PATENTS

| | | |
|---|---|---|
| 702,779 | 1/1954 | Great Britain. |
| 853,495 | 11/1960 | Great Britain. |

MARK M. NEWMAN, Primary Examiner

D. HART, Assistant Examiner

U.S. Cl. X.R.

60—258, 259